March 8, 1966 K. B. MARTIN ETAL 3,238,574

SEAL

Filed May 1, 1964 2 Sheets-Sheet 1

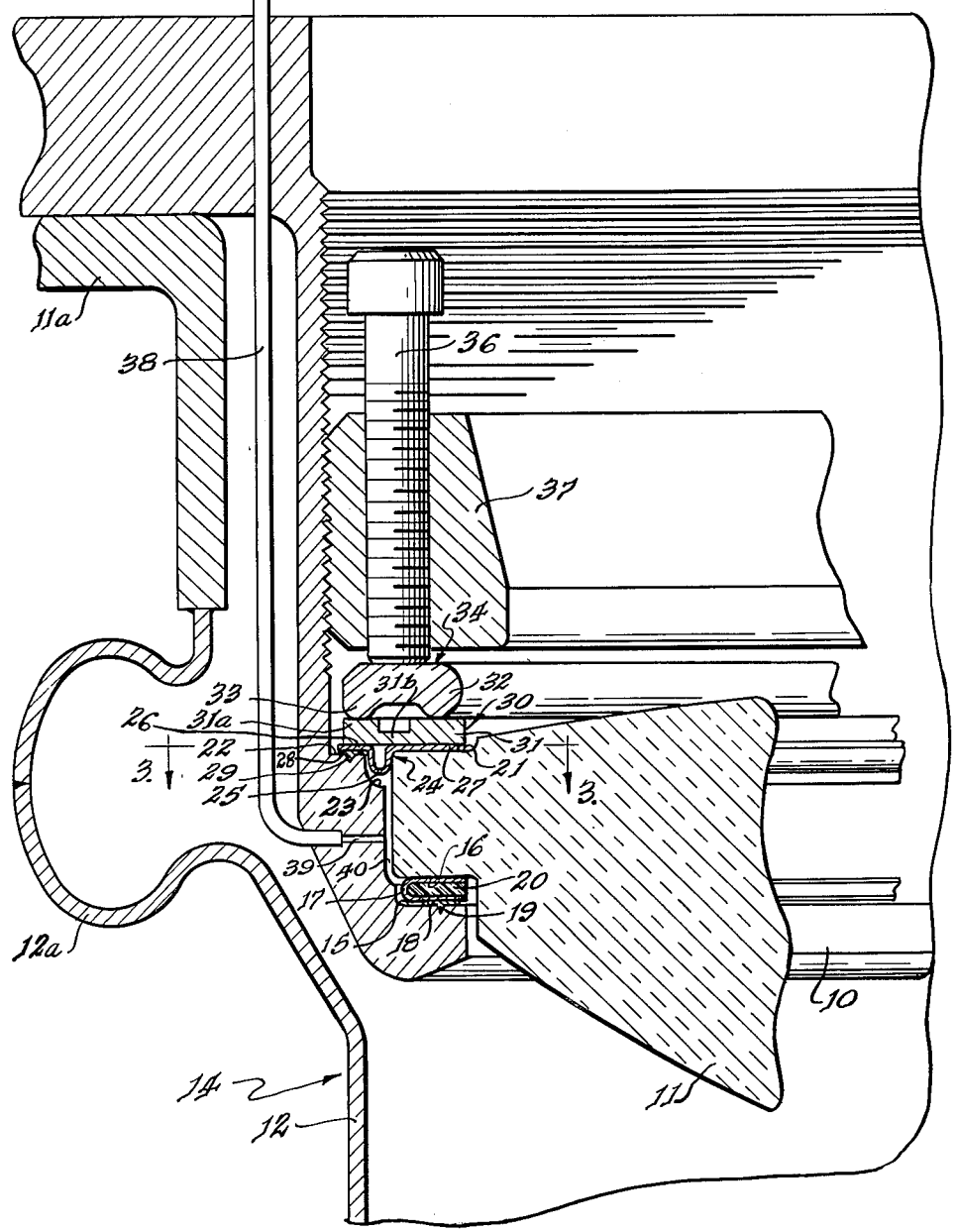

3,238,574
SEAL
Kenneth B. Martin, Joliet, Edward G. Pewitt, Hinsdale, and Thomas H. Fields, Evanston, Ill., and John G. Fetkovich, Oakmont, Pa., assignors to the United States of America as represented by the United States Atomic Energy Commission
Filed May 1, 1964, Ser. No. 364,344
10 Claims. (Cl. 20—69)

The invention described herein was made in the course of, or under, a contract with the U.S. Atomic Energy Commission.

This invention relates to seals that are leak-tight at high and low pressure differences and over wide ranges of temperature. More specifically, the invention relates to seals for use between parts or materials whose sizes change in differing amounts or at different rates with changes in temperature.

In the drawings:

FIG. 2 is a fragmentary sectional view of the region in the enclosure 2 of FIG. 1 showing the novel seals in detail.

Figure 1:
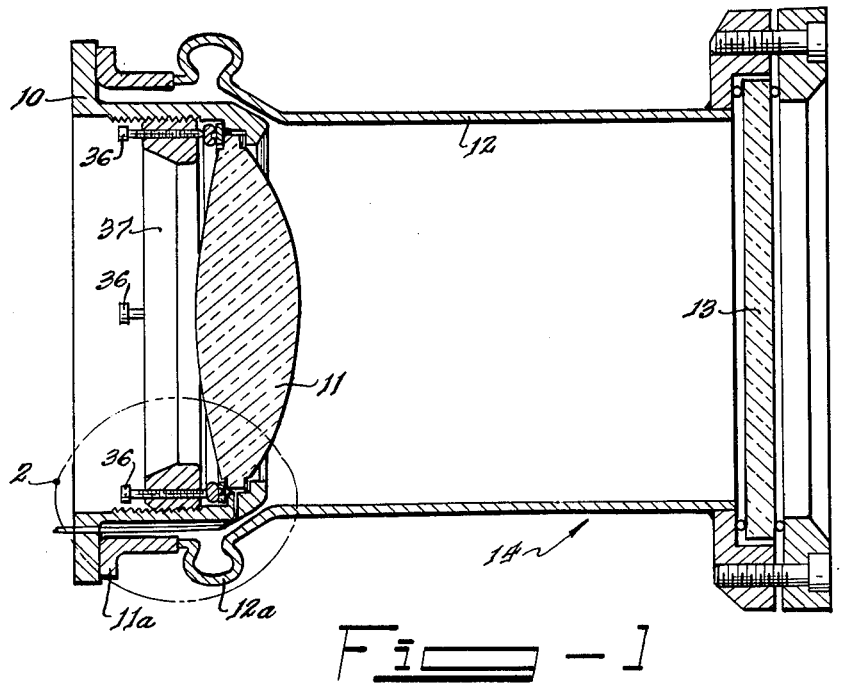
FIG. 1 is a longitudinal sectional view of a bubble chamber on which the novel seals of the present invention are employed.

As shown in FIG. 1, the present invention is directed to a sealing construction operating between an outer member 10 in the form of a body and an inner member 11 in the form of a lens contained by the body. The lens 11, the body 10, a head 11a, a cylinder 12, an expansion member 12a sealingly connecting the head with one end of the cylinder, and a glass window 13 sealed to the other end of the cylinder form a bubble chamber 14. The chamber is adapted to contain liquid hydrogen, deuterium, or helium, and the cylinder 12, is to be surrounded by superconducting magnets (not shown). To the left of the lens 11 there is a light source (not shown), and to the right of the window 13 there is a camera (not shown). The lens 11 is preferably formed of a cast acrylic resin such as methyl methacrylate, because it is easy to fabricate, is light in weight, and has a relatively high resistance per unit mass to shock loads such as encountered in axial vibration or oscillation of the lens during operation of the bubble chamber. The body 10 is of stainless steel. The body 10 and lens 11 are circular and concentric.

Figure 3:
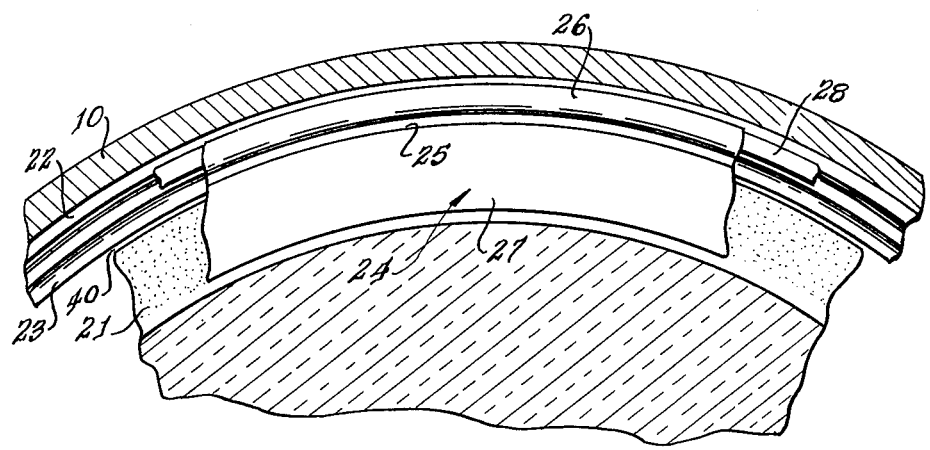
FIG. 3 is a fragmentary transverse sectional view taken on the line 3—3 of FIG. 1.

As shown in FIGS. 2 and 3, the body 10 and lens 11 have annular surfaces 15 and 16, respectively, which are transverse or perpendicular to the axes of the body and the lens and face one another. Between the surfaces 15 and 16 lies a soft aluminum ring 17 in the form of a U having its legs transverse or perpendicular to the axes of the body 10 and the lens 11 and its open end at the inner periphery of the ring. One leg of the U of the ring 17 is adjacent the surface 16 of the lens 11 and is joined thereto in a resin bond formed of an epoxy resin and a polyamide resin under elevated temperature and pressure applied over a considerable length of time. The other leg of the U of the ring 17 is pressed against a ring 18 of 10% by wt. silver and balance indium. The ring 18 is applied to the surface 15 of the body 10, a V-shaped annular rib 19 on the ring 18 being received in a V-shaped annular groove formed in the surface 15. Within the ring 17 is located a relatively slippery filler ring 20 formed of a woven fabric of a linen base coated and bonded with phenolic or melamine resins and cured at elevated temperature and pressure. The aluminum ring 17 is spun over the filler ring 20.

On the side opposite the annular surface 16, the lens 11 has an annular surface 21, which is transverse or perpendicular to the axes of the lens and body 10. The body has an annular surface 22, which is transverse or perpendicular to the axes of the body and the lens 11, lies generally in the same plane as the surface 21 perpendicular to the axes of the body and the lens, and is radially outwardly spaced from the surface 21. An annular space 23 formed between the body and the lens lies between the surfaces 21 and 22.

A soft aluminum ring 24 has a radially expandible convolution 25 and flanges 26 and 27. The convolution 25 is located in the annular space 23 and takes the form of a U having legs parallel to the axis of the ring 24. The flanges 26 and 27 extend radially outwardly and inwardly, respectively, from the convolution 25. The flange 27 is joined to the surface 21 of the lens 11 in the same way as the ring 17 to the surface 16 of the lens. The flange 26 is pressed against a lead ring 28 which is applied to the surface 22 of the body 10, a V-shaped annular rib 29 on the ring 28 being received in a V-shaped annular groove formed in the surface 22.

Pressure is applied against the flanges 26 and 27 of ring 24 by a side of a flat ring 30 of stainless steel, which side lies in a plane perpendicular to the axis of the ring 30. The ring is deeply grooved at its other side and so comprises relatively thick radially inner and outer portions 31 and 31a separated by a relatively thin intermediate portion 31b. Pressure is applied against portions 31 and 31a of ring 30 by rounded portions 32 and 33 of a spring ring 34 of stainless steel. The spring ring is engaged by a plurality of loading screws 36 distributed about a clamping ring 37 and threaded therethrough. The clamping ring 37 has threaded engagement with the interior of body 10.

A vacuum line 38 is connected to a passage 39 in the body 10 leading to a space 40 which is located between the body 10 and lens 11 and between the aluminum rings 17 and 24. The purpose of the vacuum line 38 connected as stated is to exhaust the space 40 and thus to prevent leakage from the chamber 14 past the aluminum rings 17 and 24 from polluting the vacuum space outside the lens 11, i.e., the space to the left of the lens 11 as viewed in FIG. 1 or above the lens as viewed in FIG. 2.

In operation, liquid hydrogen at about 90 p.s.i. abs., liquid deuterium at about 120 p.s.i. abs., or liquid helium at 10 p.s.i. abs. or a little below, will be in the chamber 14 between the lens 11 and the window 13. When the chamber is cooled to the temperatures needed for the above conditions, the diameter of the methyl methacrylate lens 11, if it is 10½", may decrease as much as 110 mils. At the same time the diameter of the stainless-steel body 10 decreases about 32 mils over the same temperature. Contraction does not occur uniformly during the cooling. For a thickness of ½" of the portion of the lens 11 between the aluminum rings 17 and 24, the contraction of this portion is 5 mils, in contrast with 1.5 mils for the stainless-steel body 10.

As the lens 11 contracts radially during cooling, the annular surface 16 of the lens moves radially inward, or to the right as viewed in FIG. 2, with respect to the annular surface 15 of the body 10. Thus, there is a lengthwise shifting of one leg of the U of the ring 17 with respect to the other leg, since the one leg is bonded to the lens 11 and the other leg tends to stick to the indium-silver ring 18 fixed to the surface 15 of the body 10. Such relative movement of the legs of ring 17 can take place, because the filler ring 20, being of fabric of linen base coated with resin, is slippery enough to permit the legs of ring 17 to slide over the ring 20. The filler ring 20 is, of course, required in the ring 17, so that sufficient pressure may be applied between the lens 11 and body across the ring 17 to produce a seal between the indium-silver ring 18 and the adjacent leg of ring 17. The ring 18 is made of indium and silver, rather than indium alone, because pure indium would flow and thin too readily under pressure, thus causing insufficient sealing pressure. Resin-coated linen-base fabric is ideal as the material of the filler ring 20 not only because it is slippery, but also because it contracts at about the same rate as the methyl methacrylate of the lens 11 and at a somewhat greater rate than the aluminum of the ring 17 and thus shrinks away from the closed end of the U of ring 17 and facilitates relative movement of the legs of the ring 17 during cooling.

Aluminum is ideal as the material of the ring 17, because it is readily bonded to the lens 11, is easily spun over the filler ring 20, is soft enough to seal well with the indium-silver of the ring 18, and contracts at a rate between that of the stainless steel of the body 10 and the methyl methacrylate of the lens 11.

Aluminum is ideal as the material for the ring 24, because it is readily bonded to lens 11, is easily shaped into the U-portion 25 and flanges 26 and 27, readily seals under pressure with the lead ring 28, and contracts at a rate between that of the stainless steel of the body 10 and the methyl methacrylate of the lens 11.

Lead is selected as the material of the ring 28, because indium-silver, as used in the ring 18, would be too soft for the pressure exerted between the ring 28 and the flange 26 of the ring 24. Greater sealing pressure is needed between these parts, because leakage here is not saved by the vacuum line 38, as is the case with leakage between the rings 17 and 18. Greater pressure is applied between the flange 26 and the ring 28 than across the flange 27, the lens 11, and the rings 17, 20, and 18, because the portion 33 of the spring ring 34 contacts the thin ring 30 closer to the axes of the screws 36 than does the portion 32.

As the chamber 14 cools, the radially inward shrinking of the lens 11 with respect to the body 10 due to the greater contraction rate of the lens causes the flange 27 of the ring 24 to move radially inwardly with respect to the flange 26 of the ring 24, because the flange 27 is bonded to the lens and the flange 26 is firmly clamped to the ring 28 fixed to the body. The convolution 25 of the ring 24 permits such relative movement of the flanges 26 and 27. The clamping force of the flat ring 30 against the flange 27 is low enough to allow the flange 27 to slide radially with respect to the ring 30 without damage to the ring 24 or the lens 11. Since the flange 27 and the side of the ring 30 engaging it are planar or flat, the pressure between them is uniformly distributed over the area of contact, and there are no individual separated regions of excessive pressure such as would prevent the sliding of the flange 27 on the ring 30 upon radial contraction of the lens 11.

When the bubble chamber 14 cools, the greater contraction of the lens 11 causes the surface 21 of the lens to move downward as viewed in FIG. 2 with respect to the surface 22 of the body 10. This causes an axial shifting of the radially inner portion 31 of ring 30 with respect to the radially outer portion 31a, and such axial shifting can occur because of the thin portion 31b of ring 30. Moreover, portion 32 of ring 34 must also shift with respect to portion 33, and this can happen because the ring 34 is a spring ring. As the rings 30 and 34 are deformed under the circumstances just described, suitable pressure is maintained between them, because the portions 32 and 33, being rounded, roll on the ring 30.

The intention is to limit the invention only within the scope of the appended claims.

The embodiments of the invention in which an exclusive property or privilege is claimed are defined as follows:

1. An assembly comprising a pair of circular concentric inner and outer members having facing annular surfaces transverse to the axes of the members, a U-shaped aluminum ring having one leg of the U bonded to one of said surfaces, an indium-silver ring applied to the other of said surfaces and engaging the other leg of the U of the aluminum ring, a relatively slippery filler ring located in the aluminum ring, and means acting against the members to press the said surfaces thereof toward one another.

2. The assembly specified in claim 1, the legs of the U of the aluminum ring extending transversely of the axes of the members, the open end of the U being radially inward of the closed end thereof.

3. The assembly specified in claim 2, the indium-silver ring being applied to the said other surface by an annular V-shaped rib on said ring fitting in an annular V-shaped groove in said other surface.

4. The assembly specified in claim 3, the inner member being of an acrylic resin, the outer member being of stainless steel, the said one leg of the U of the aluminum ring being joined to the inner member in a resin bond.

5. An assembly comprising a pair of concentric inner and outer members having at least two annular surfaces located generally in the same plane transverse to the axes of the members and being radially spaced from one another by an annular recess formed between the members, an aluminum ring having a convolution in the shape of a U having its legs parallel to the axes of the members and flanges at the ends of the legs extending transversely thereto, the U lying in the said annular recess between the members, one flange overlapping and bonded to one of said two surfaces of the members, the other flange overlapping the other of the said two surfaces, a lead ring positioned between said other flange and said other of said two surfaces, and means for pressing said one flange of the aluminum ring against the surface to which it is bonded, said other flange against the lead ring, and the lead ring against said other of said surfaces.

6. The assembly specified in claim 5, the lead ring being applied to the said other surface by an annular V-shaped rib on said ring fitting in an annular U-shaped groove in said other surface.

7. The assembly specified in claim 6, the inner member being of an acrylic resin, the outer member being of stainless steel, the said one flange of the aluminum ring being joined to the inner member in a resin bond.

8. An assembly comprising
  (A) concentric inner and outer members, the inner member having two annular surfaces located on opposite sides adjacent its periphery and generally transverse to the axis of the inner member, the outer member having two annular surfaces on its interior, these surfaces extending generally transverse to the axis of the outer member, facing in the same direction and being displaced from one another radially and axially of the outer member, one surface of the inner member and one surface of the outer member facing and overlapping one another, the other surface of the inner member and the other surface of the outer member facing in the same direction, lying generally in the same plane, and being radially spaced from one another by an annular recess formed between the members;
  (B) a first seal located between the said one surface of the inner member and said one surface of the outer member and comprising (1) a first aluminum ring in the shape of a U having one leg bonded to the said one surface of the inner member and the open end of the U facing radially inwardly, (2) a relatively slippery filler ring located in the first aluminum ring, and (3) an indium-silver ring applied to the said one surface of the outer member and being engaged by the other leg of the U of the first aluminum ring;
  (C) a second seal located between the other surfaces of the members and comprising (1) a second aluminum ring having a convolution in the shape of a U having its legs parallel to the axes of the members and provided with flanges at the ends of the legs extending transversely thereto, the U lying in the said annular recess between the members, one flange overlapping and bonded to the said other surface of the inner member, and (2) a lead ring applied to said other surface of the outer member, and being overlapped by the other flange of the second aluminum ring; and (D) means for applying pressure against the flanges of the second aluminum ring to press (1) said one flange thereof against said other surface of the inner member, (2) said other flange of the second aluminum ring against the lead ring and the lead ring against said other surface of the outer member, and (3) said one surface of the inner member toward said one surface of the outer member to squeeze the first aluminum ring, the filler ring, and the indium-silver ring therebetween.

9. The assembly specified in claim 8, the outer member being of stainless steel, the inner member being of acrylic resin.

10. The assembly specified in claim 9, the means for applying pressure comprising a flat ring having a flat planar side engaging the flanges of the second mentioned aluminum ring and being composed of relatively thick radially inner and outer portions and a relatively thin portion lying therebetween, a spring ring having rounded portions engaging the said radially inner and outer portions of the flat ring, a threaded ring located on the side of the spring ring away from the flat ring and having a threaded connection with the outer member, and screws having threaded connection with openings in the threaded ring and their ends acting against the side of the spring ring away from the flat ring.

References Cited by the Examiner

UNITED STATES PATENTS

| | | | |
|---|---|---|---|
| 2,545,290 | 3/1951 | Long | 220—46 X |
| 2,690,275 | 9/1954 | Alt et al. | 220—46 |
| 2,850,201 | 9/1958 | Liljeblad | 220—46 X |
| 2,922,543 | 1/1960 | Barclay et al. | 220—46 X |

FOREIGN PATENTS 732,020   6/1955   Great Britain.

HARRISON R. MOSELEY, *Primary Examiner.*

W. E. HEATON, *Assistant Examiner.*